United States Patent [19]

Liberge

[11] 4,340,998
[45] Jul. 27, 1982

[54] HOOK FOR ELASTIC CABLE

[75] Inventor: Guy Liberge, Charbonnieres-les-Bains, France

[73] Assignee: Joubert S.A., France

[21] Appl. No.: 128,917

[22] Filed: Mar. 10, 1980

[30] Foreign Application Priority Data

Mar. 16, 1979 [FR] France ............... 79 07223

[51] Int. Cl.³ .................................... F16G 11/00
[52] U.S. Cl. ............................... 24/130; 24/343
[58] Field of Search ........... 24/130, 129 R, 129 B, 24/343, 344, 345, 346

[56] References Cited

U.S. PATENT DOCUMENTS

| 828,765 | 8/1906 | Nilsson | 24/130 |
| 1,059,630 | 4/1913 | Poetzsch | 24/130 |
| 3,343,809 | 9/1967 | Newell | 24/130 UX |
| 3,715,782 | 2/1973 | Newell | 24/130 R X |
| 4,178,661 | 12/1979 | Klein | 24/130 |

FOREIGN PATENT DOCUMENTS

| 2350495 | 4/1975 | Fed. Rep. of Germany | 24/130 |
| 360945 | 5/1906 | France | 24/130 |

*Primary Examiner*—Dennis L. Taylor
*Attorney, Agent, or Firm*—Arnold, White & Durkee

[57] ABSTRACT

Disclosed is a sandow device having an elastic cable with a monoblock mechanism including a hook integrally connected with a joint base plate having two parallel longitudinal canals holding the ends of the cable. The canal located closest to the hook holds the stretched end of the cable while the second canal located closest to the exterior receives the free non-stretched end. The two canals are separated by a partition which has at its upper portion a V-profile gap whose point is directed toward the bottom of the mechanism. The exterior canal further has disposed therein a means for maintaining the elastic cable which may be in the form of a plurality of parallel flanges.

15 Claims, 11 Drawing Figures

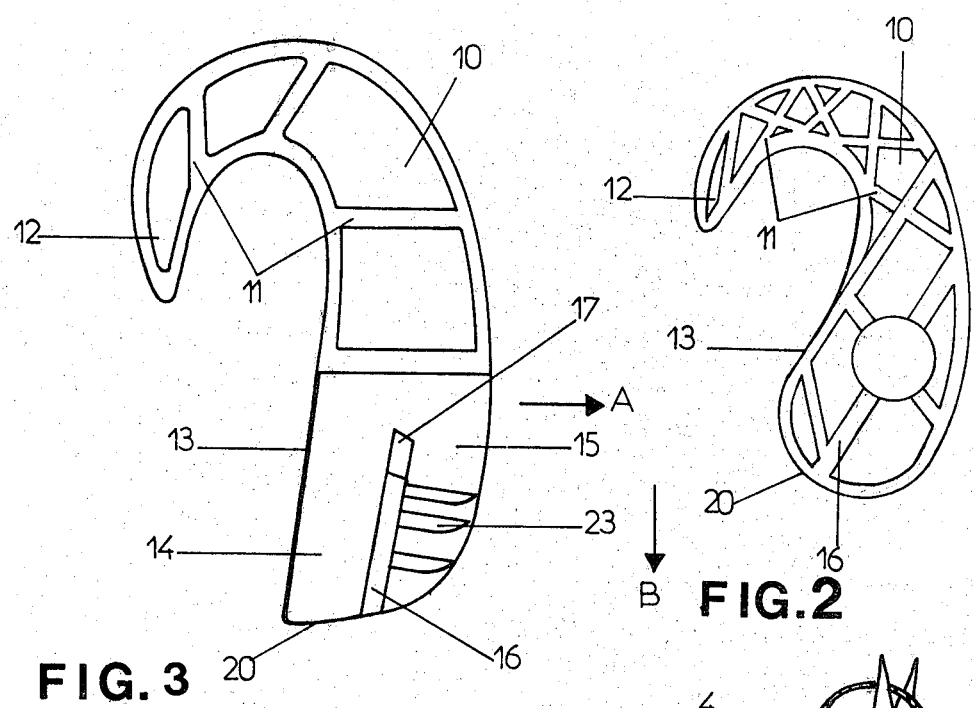
FIG. 3
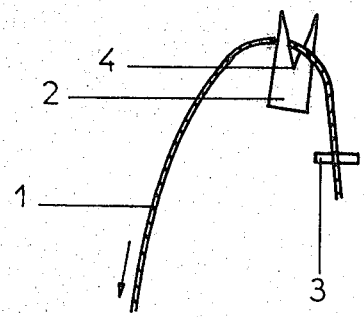
FIG. 2
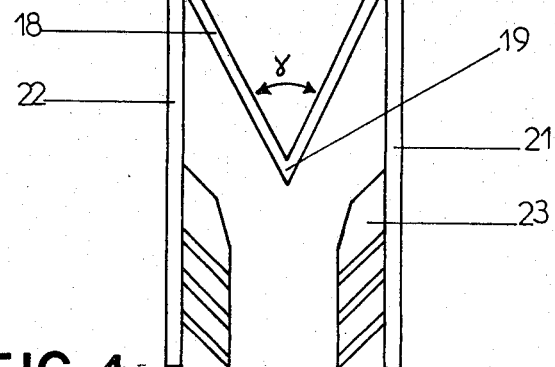
FIG. 1
FIG. 4

HOOK FOR ELASTIC CABLE

BACKGROUND OF THE INVENTION

This invention concerns a device for fastening, anchoring, tying, or blocking an elastic cable. More specifically, it aims at a device for blocking an elastic cable end, that is to say, an elastic filiform element, for example, of the type commonly known in the trades under the name of "sandow" which is employed for multiple uses.

In the description, the term sandow designates an elastic cable which is provided with fixation devices, while the term "sandow cable" only designates the elastic cable.

Generally, sandows are funished at their ends with hooks which, most often, are made of a steel thread, sometimes laminated. The end of the hook is wound in a conical spiral shape, in such a way as to hold the blocked cable end, either by a knot or by an upturned end or any other equivalent device.

These products have numerous defects. First of all, the use of metallic hooks has been found to be dangerous. Next, the end fixation of the cable is an expensive operation, difficult to mechanize. Finally, the length of the cable in this type of arrangement is predetermined.

There have been proposed solutions to avoid the dangers of metallic hooks. Among those are the use of plastic hooks; but this is proven to be unsatisfactory. In several instances blocking devices for a cable have used a slit with a V-type opening (see U.S. Pat. Nos. 1,986,994, Armacost and 4,077,093, Emery). The V profile gap shown in these references has a very sharp angle, approximately 10 to 20 degrees, so that it is a question of a slit with slightly divergent sides whose lip thickness is important, that is, on the order of the diameter of the cable. The effect produced is analogous to a locking between two jaws. Thus, use of this device with an elastic cable has the effect of the locking mechanism being essentially the result of the elasticity of the cable.

SUMMARY OF THE INVENTION

The monoblock mechanism of the present invention overcomes the disadvantages of the prior art. The present invention provides a means for fastening an elastic cable which includes a hook integral with a joint base plate having two parallel longitudinal canals for receiving and holding the ends of the cable. The canal closest to the hook will hold the stretched end of the cable while the second canal which is located furthest to the outside, holds the free non-stretched end of the cable. The two canals are separated by a partition which has as its upper portion, a "V" profile gap whose point is directed toward the bottom of the integral piece, that is, away from the hook. The canal located closest to the outside, has a plurality of flanges which are placed above and below the point of the V for maintaining the free end of the elastic cable.

In one embodiment of the invention, the maintenance device may be formed by a plurality of flanges inclined toward the bottom or away from the hook and affixed to the partition of the canal at whose point separation is less than the diameter of the cable to be maintained. The flanges may be semi-rigid in nature.

Further provided in the preferred embodiment is a V profile gap in the range of 40 to 60 degrees and more particularly in the neighborhood of 50 degrees. The structure of the V gap is also rounded in such a way to avoid the rupture of the material which makes up the block, for example a plastic material. The maintenance device in the preferred embodiment has an ovoid shape whose small diameter is less than the diameter of the cable, so that it is constantly compressed, or any other form, such that the flanges are inclined in the opposite direction with respect to the traction, and which are, for this reason self-locking.

In an alternate embodiment, the V profile gap is connected by its point to a vertical branch, in such a way as to have the general profile shape in the form of a Y.

BRIEF DESCRIPTION OF THE DRAWINGS

For a better understanding of the invention reference may be had to the following figures in which like parts are designated by the same reference numerals:

FIG. 1 is a schematic representation of the general concept to which the invention refers;

FIG. 2 is a side view of a hook in accordance with the present invention;

FIG. 3 is a longitudinal cut of the hook of FIG. 2;

FIG. 4 is a back perspective of the canal which has the maintenance device disposed therein;

DETAILED DESCRIPTION OF THE PREFERRED EMBODIMENT

Figure 5:
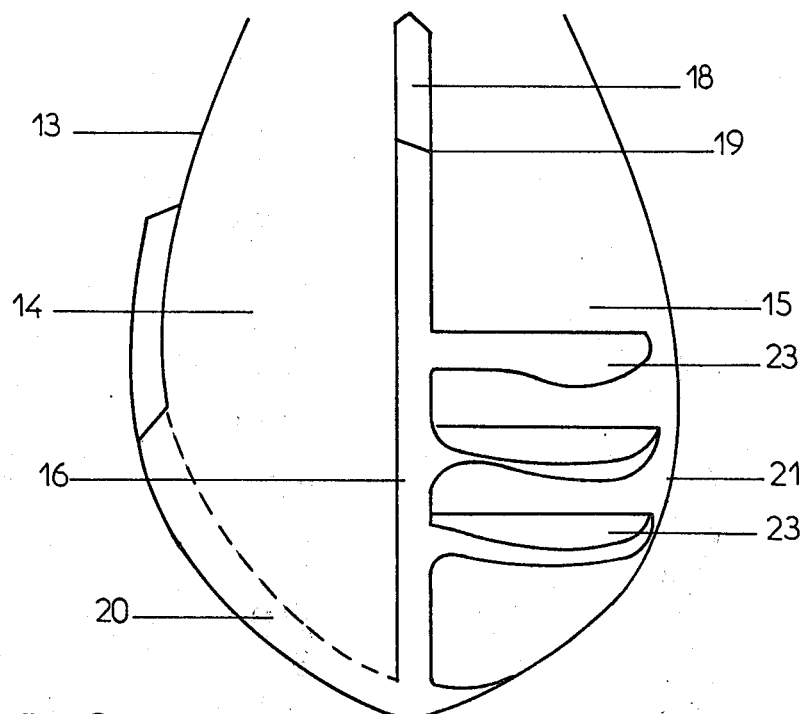
FIG. 5 is a longitudinal cut of the partition which is located between the two canals.

Referring now to the Figures and more particularly FIG. 1 where a schematic view shows the concept of the invention. The elastic cable 1, in order to be fastened, anchored or tied, is first submitted to a compression device 2 which has a V profile gap but in a thin blade which is located in a parallel plane with a stretch fraction of the cable, then, at least, in a maintenance device 3, placed above the compression device 2 and below the point 4 of this device.

FIGS. 2 through 9 illustrate a monoblock device in accordance with the invention which may be made of a molded polypropylene. The monoblock mechanism or sandow comprises a hook 10 reinforced by appropriate flanges 11 inclined in a manner of a beam so that the catch 12 does not seriously warp under the effect of any force. A base plate 13 is provided integrally with the hook 10 which base plate has two parallel longitudinal canals 14 and 15 respectively, separated by a thin partition 16 which is placed in the longitudinal axis of the base plate 13, that is, parallel to the stretch fraction of the cable. The partition 16 has an upper portion 17 with a V profile gap 18 whose point 19 is directed toward the bottom or away from the hook 10. The thickness of the partition 16 is on the order of a third of the diameter of the nonstretch cable to be inserted (for example, for a non-stretch elastic cable of 10 millimeters diameter, the thickness of the partition 16 may be 3.5 millimeters).

Figure 8:
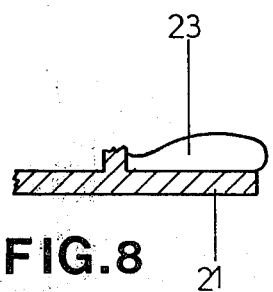
FIGS. 8 and 9 illustrate a detailed cut-away of the inclined flanges.

The first canal 14 in the base 13 is located closest to the catch 12 and has, on the bottom, an opening 20 which is used for the cable to be fastened and its interior is distinctly of a smooth finish. The second canal 15, located closest to the outside with respect to the catch 12, is open and is formed by two parallel flasks 21 and 22 without hood, and has an interior of flanges 23 which are inclined toward the bottom and designed to maintain the cable in position. These flanges 23 are placed with respect to the direction of the traction applied to a cable below the point 19 of the V profile gap 18. The flanges 23 more particularly illustrated in FIG. 8 are decurrent, that is, have a progressive profile in the manner of the laminae of leaves, so that they maintain the cable to be fastened having a diameter D more than the interval L between the ends and between flange points of the two different rows fastened to the two opposite partitions 21 and 22.

Figure 9:
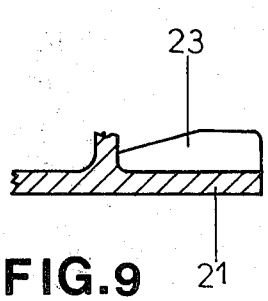

FIG. 9 illustrates an alternate embodiment of the flanges 23 whose shape is simpler to achieve in mold but is none the less a self-locking feature. The flanges 23 are inclined toward the bottom, in the opposite direction of the traction and therefore self-locking when traction is administered to the cable introduced between the two flange rows. The plane of the interval between these two flange rows 23 is perpendicular to the plane which contains the V profile gap 18. The intersection of these two planes is parallel to the direction of the traction.

Figure 6:
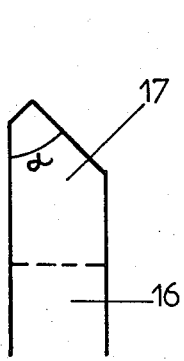
FIG. 6 is a detailed cut-away of the upper portion of the partition which represents the V gap.
Figure 7:
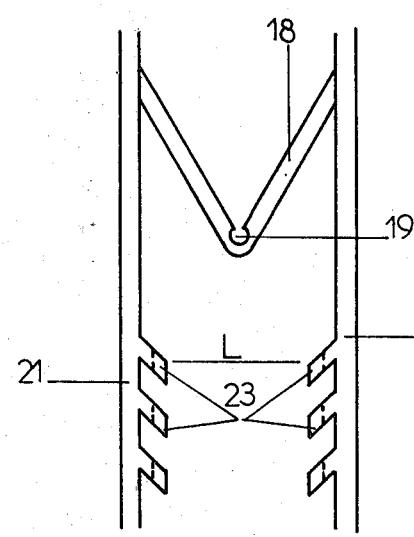
FIG. 7 is a transversal cut-away of the base plate.

As shown in FIG. 4 an angle gamma at the summit of the V gap 18 may be in the range of 40 to 60 degrees. The profile at the summit of the partition 16 may conform to what is represented in FIG. 6 with summit angle alpha near 60 degrees permitting the reduction of the thickness of the partition 16 and the maximization of the convergent compression forces. The thickness of the partition is of the order of a third of the diameter of the non-stretched cable. The bottom of the V gap 18 may be equipped with a rounded opening, as represented by 19 of FIG. 7. This will increase the spring effect of the slit of the V gap.

Operationally, the elastic cable is introduced with the free end of the cable into the opening 20, where the cable is pushed up into the longitudinal canal 14. The entire cable is pulled through the V gap 18 to the exterior in the direction indicated by the arrow A (FIG. 3). When the length of the cable which extends is sufficient, the cable is bent back on the flanges 23 and with light pressure, for example thumb pressure, the cable penetrates between the flanges 23 and is firmly maintained. The flanges thus serve as a means of maintenance. Under the effects of a firm traction, the cable is progressively engaged in the gap 18 which plays a role as a compression device.

The base plate 13 may or may not be aligned with the hook 10, and the flasks 21–22 may have a surface 30 for an identification inscription.

As a practical matter the axis of the hook 10, and more precisely the point of application of the hook 10 when the cable is extended, must be as near as possible to the plane defined by the partition 16, at least at the narrow space near the cable.

Figure 10:
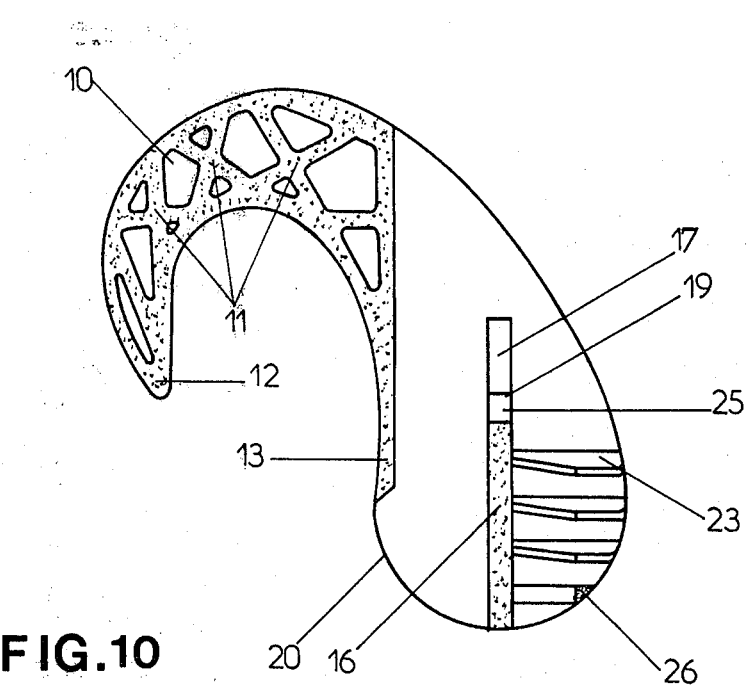
FIGS. 10 and 11 illustrate a different view of a longitudinal cut (FIG. 10) and a back perspective detail of the canal which has the maintenance device in the Y profile gap (FIG. 11).
Figure 11:
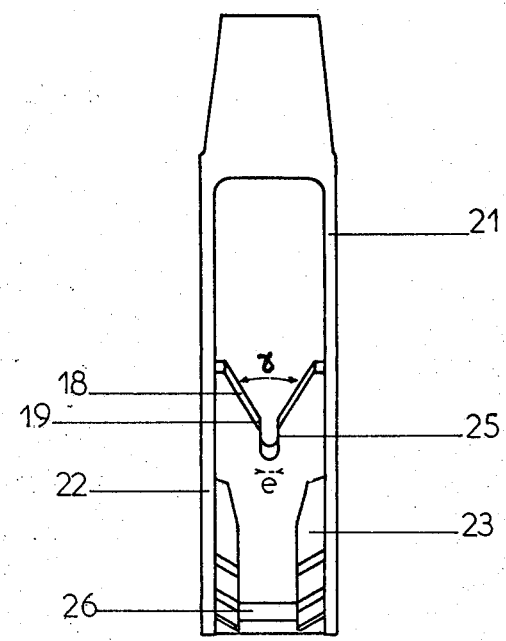

FIGS. 10 and 11 represent an alternative embodiment of the invention. The V profile slit 18 is connected by its point 19 at a vertical branch 25 in such a way as to have a general profile in the form of a Y, as shown in FIG. 11. In this embodiment the angle gamma may be in the range of 45 to 55 degrees. The thickness e is between one-fifth and one-third of the diameter of the non-stretched elastic cable. The height of the vertical branch of the Y is between a third and a half of the diameter of this nonstretched cable.

It has been observed that if these dimensions are less, the cable cannot penetrate into the gap 18 and if they are greater the cable will not be locked. A further distinction between the alternate embodiment and the preferred embodiment is the end of the partition 16 is not bevelled as shown in FIG. 6.

Finally, to avoid the flasks 21 and 22 from becoming separated in the course of time, and so that the free non-stretched end of the cable which is locked in the flanges 23 does not loosen, the flask 21 and 22 are connected by bar 26 which is derived directly from the mold.

The sandow in accordance with the present invention has numerous advantages over the commercialized devices presently available. For example there is a facility of construction and therefore a better dollar return, and simplifying of the performance of mounting the cable on the hook giving rise to the possibility of automating the production operations. Further, the invention allows the fastening of the cable at any point in its length and therefore the possibility of regulating the size of the cable. Also, there is reduced danger in case the cable unexpectedly snaps back due to the use of the molded plastic, and finally the adaptability of different diameter cables.

It will be understood that a preferred embodiment of the invention has been described and that many changes and modifications may be made by a person of ordinary skill without departing from the spirit and scope of the invention.

What is claimed is:
1. A sandow comprising:
   an elastic cable;
   a monoblock mechanism including:
      a hook,
      a joint base plate integrally connected to said hook having interior and exterior parallel canals longitudinal with said base plate for holding the ends of said cable, said interior canal located in close proximity to the hook holding the stretched end of said cable, while said exterior canal holds the nonstretched free end of said cable,
      a partitioned wall separating said interior and exterior canals, said wall having an upper and lower portion, with said upper portion including a V like profile gap whose point is directed away from said hook, and
      a means for maintaining said free end of said cable disposed in said exterior canal said means further located below the point of said V gap.

2. A sandow as set forth in claim 1 wherein said exterior canal is defined by two parallel flasks.

3. A sandow as set forth in claim 1 wherein said means for maintaining said free end of said cable comprise a plurality of parallel flanges.

4. A sandow as set forth in claim 2 wherein said means for maintaining said free end of said cable comprises a plurality of parallel flanges wherein said flanges are disposed on said flasks.

5. A sandow as set forth in claim 3 or 4 wherein said plurality of flanges are decurrent.

6. A sandow as set forth in claim 1 wherein said partition has a thickness on the order of one-third of the diameter of said nonstretched cable.

7. A sandow as set forth in claim 6 wherein said diameter of said nonstretched elastic cable is 10 millimeters and said thickness of said partition is 3.5 millimeters.

8. A sandow as set forth in claim 3 or 4 wherein said parallel flanges are separated by a distance less than the diameter of said cable.

9. A sandow as set forth in claim 1 wherein said partitioned wall has a V profile gap with said V partition connected by its point to a vertical branch in such a way to form a Y profile gap.

10. A sandow as set forth in claim 9 wherein said vertical branch of said Y profile is between one-third and one-half of said diameter of said non-stretched elastic cable.

11. A sandow as set forth in claim 1 wherein the angle at the summit of said V profile gap is in the range of 50 to 60 degrees, said gap having a thickness in the range of one-fifth to one-third of the diameter of the non-stretched elastic cable whereby the V profile effects a self-locking mechanism.

12. A sandow as set forth in claim 9 wherein the angle at the summit of said Y profile gap is in the range of 45 to 55 degrees and having a thickness of said Y profile gap on the order of one-third of the diameter of the non-stretched cable.

13. A sandow in accordance with claim 1, wherein said device is made from a molded plastic material.

14. Apparatus for blocking an elastic cable comprising:
a hook,
a joint base integrally connected with said hook, having interior and exterior parallel canals longitudinal with said base plate for holding the ends of said cable, said interior canal located in close proximity to the hook holding the stretched end of said cable, while said exterior canal holds the nonstretched free end of said cable,
a partitioned wall separating said interior and exterior canals, said wall having an upper and lower portion, with said upper portion including a V profile gap whose point is directed away from said hook, and
a means for maintaining said free end of said cable, disposed in said exterior canal, said means further located below the point of said V gap.

15. A self-locking monoblock mechanism for blocking an elastic cable, comprising:
a hook integral with a joint base plate having a plurality of canals longitudinal therewith for receiving and holding the free end of said elastic cable, a partitioned wall for separating said plurality of canals, said partitioned wall having a V profile gap for receiving said elastic cable, and means for maintaining said free end of said elastic cable disposed in one of said plurality of canals, whereby said means for maintaining said free end of said cable and said V profile gap effect a locking of said elastic cable to said monoblock device.

* * * * *